E. A. NILSSON.
AIR DISTRIBUTER FOR PNEUMATIC MILKING MACHINES.
APPLICATION FILED AUG. 5, 1910.
992,238.
Patented May 16, 1911.
2 SHEETS—SHEET 1.
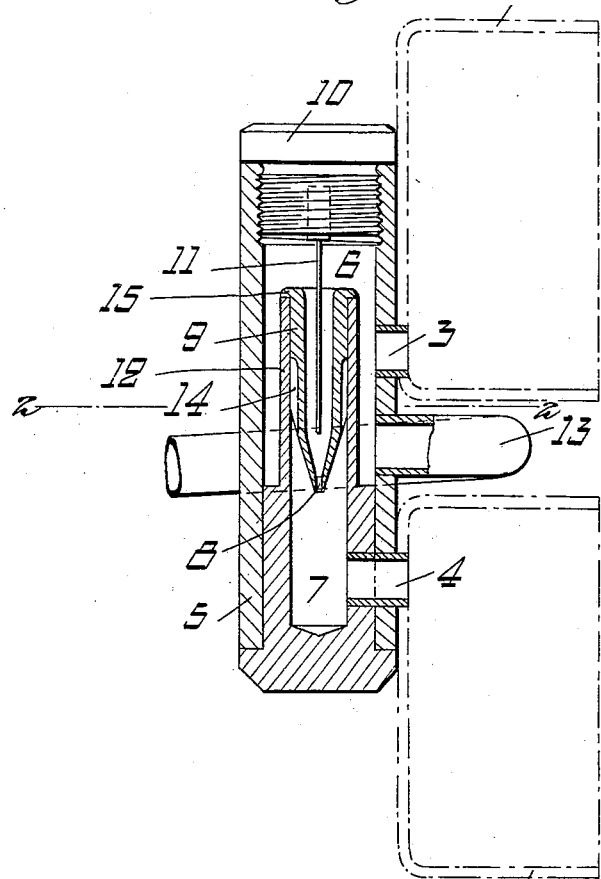
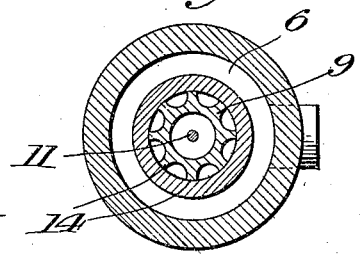
WITNESSES:
INVENTOR
Erik Arvid Nilsson
BY
Harding & Harding
ATTORNEYS.

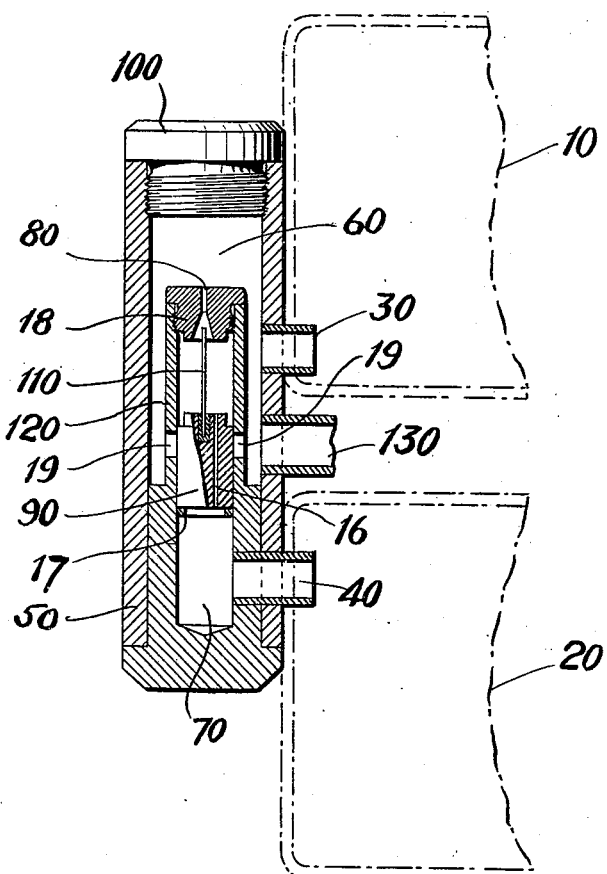

UNITED STATES PATENT OFFICE.

ERIK ARVID NILSSON, OF HORNSBERG, STOCKHOLM, SWEDEN, ASSIGNOR TO MJOLK-NINGSMASKIN AKTIEBOLAGET, OF HORNSBERG, STOCKHOLM, SWEDEN.

AIR-DISTRIBUTER FOR PNEUMATIC MILKING-MACHINES.

992,238. Specification of Letters Patent. Patented May 16, 1911.

Application filed August 5, 1910. Serial No. 575,660.

*To all whom it may concern:*

Be it known that I, ERIK ARVID NILSSON, a subject of the King of Sweden, and residing at Hornsberg, Stockholm, Sweden, have invented certain new and useful Improvements in Air-Distributers for Pneumatic Milking-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an air-distributing device for milking machines, said device having for its object the distribution of the air under pressure to the different organs for pressing out the milk acting upon the teats.

The milking organs may be either pistons movable in cylinders and connected with plates or the like acting upon the teats, or flexible tubes or the like, which are expanded by the air pressure and thereby press upon the teats.

The air-distributing devices hitherto known and applied to milking machines generally comprise an air receiver divided into two or more compartments communicating with each other by means of very narrow passages, allowing only a slow equalization of the pressure in the different compartments, and further communicating with the milking organs. In constructions of this kind the inconvenience easily occurs that the narrow passages are stopped up by dust and oil particles entering with the air, the consequence being that the action of the milking organs is stopped or at least that the strokes of said organs are effected in another time than calculated on. According to the present invention this inconvenience is avoided by providing in the narrow openings or passages connecting the different compartments of the air-distributer, clearing-needles or the like, which are actuated by the pressure of the air, as it passes in either or in both directions causing the needles to enter the said narrow passages and clean same from dust or the like.

The invention is illustrated in the annexed drawings, of which—

Figure 1 illustrates an air-distributer provided with the device forming the subject of the invention. Fig. 2 is an enlarged section on the line 2—2 of Fig. 1, and Fig. 3 is a view, similar to Fig. 1, of a modification.

The milking organs 1 and 2 are only schematically indicated on the drawing and it is supposed that the same consist of flexible tubes acting upon the teat, said tubes communicating through short pipes 3 and 4 with the two compartments 6 and 7 respectively of the air-distributer. These two compartments are formed by the outer cylinder 5 and the inner cylinder 12, the latter being inserted into the outer cylinder. These compartments are connected with each other by the narrow passage 8 in the top of the hollow plunger 9. A cleaning-needle 11 connected with a threaded plug 10 inserted in the top of the distributer, projects into the hollow plunger and is so regulated that the axis of the same coincides with the central axis of the plunger, the length of the needle being furthermore so adapted that when the plunger rises to its uppermost position, touching the screw-plug, the lower end of the needle will penetrate through the narrow top passage 8 of the plunger and clean the same.

The lower part of the plunger is provided with recesses in its outer wall, flanges 14 thus being formed between said recesses, said flanges acting as guides for the movement of the plunger. The length of said recesses is so adapted that when the plunger occupies its uppermost position communication is established through the said recesses between the two compartments 6 and 7.

The plunger is at the top provided with a horizontal flange 15 by which its movement in the downward direction is limited.

The above described device acts as follows: The air under pressure entering through the supply pipe 13 fills up the compartment 6 and enters the flexible tube 1 through the pipe 3, thereby dilating the former. Owing to the narrowness of the passage 8 between the two compartments the pressure is only successively and relatively slowly transmitted to the inner compartment 7 and the flexible tube 2. The tube 1, which acts upon the root of the teat, is thus first dilated and consequently the teat first compressed at this place. Then the lower tube 2 is successively dilated and the lower part of the teat squeezed, whereby the milk contained in the teat is pressed out. As soon as the pressure in the supply pipe 13 ceases, for instance by being put in communication with the atmosphere, the pressure in the outer compartment 6 suddenly descends to the atmospheric pressure, whereas the pressure in the inner cylinder is only successively and more slowly equalized. Owing to the difference in pressure in the compartments the plunger 9 rises and presses against the screw-plug beneath the cover 10, whereby the needle 11, as before described, enters the narrow passage 8. At the same time, however, air from the inner cylinder flows into the outer cylinder through the recesses formed in the outer wall of the plunger, and as soon as the difference of pressure in the two compartments is equalized, the plunger falls down and occupies the position shown on the drawing.

It is obvious that the invention is not specifically limited to an absolutely immovable needle and an absolutely movable plunger so long as the relative movability of the needle and passage 8 is maintained. For example, in Fig. 3 is shown a construction in which, in lieu of making the needle immovable and the passage movable with the plunger, the reverse arrangement is shown. In this modification 10 and 20 represent the milking organs; 30 and 40 the pipes connecting with the two compartments 60 and 70 formed by the outer cylinder 50 and inner cylinder 120 of the distributer; 90 the plunger; 100 the threaded plug at the top of the distributer; 110 the clearing needle; and 130 the supply pipe. These parts correspond to the parts shown in Fig. 1 and hereinbefore described. In this construction, however, the plunger carries the needle, and the passage 80 between the outer and inner compartments is formed in a screw-plug 18 inserted in the top of the inner cylinder. The downward movement of the plunger is limited by the ring 17 and its upward movement by the screw-plug 18. The inner cylinder 120 is provided with one or more openings 19, which are shut by the plunger when the same occupies its lowermost position but open when the plunger is raised, whereby communication is established between chambers 60 and 70. 16 is a narrow passage in the plunger. The air under pressure, entering through supply 130, fills the chamber 60 and enters the milking organ 10 through pipe 30, and is further successively transmitted to chamber 70 and milking organ 20 through pipe 40. As soon as the pressure in supply 130 ceases, the plunger 160 rises and presses against the screw-plug 18, whereby the needle enters the narrow passage 80. At the same time the openings 19 are laid bare and the air passes from chamber 70 to chamber 60. As soon as the pressure becomes equal in both chambers the plunger falls down to the position shown in Fig. 3 and the same operation is repeated.

Having now particularly described and ascertained the nature of the said invention and in what manner the same is to be performed, I declare that what I claim is:—

1. In an air distributing device for milking machines including milking organs adapted respectively to compress the teat at the root and to squeeze the remaining part of the teat, the combination with outer and inner air receivers connected with each other and adapted for connection with said organs respectively, the outer receiver being also adapted to be connected with a source of compressed air, of a plunger, in the inner receiver, having a narrow passage establishing communication between the two receivers, and a clearing needle in line with said passage and adapted, in the movement of said plunger relatively to the needle, to alternately enter, and withdraw from, said passage.

2. In an air distributing device for milking machines including milking organs adapted respectively to compress the teat at the root and to squeeze the remaining part of the teat, the combination with outer and inner air receivers connected with each other and adapted for connection with said organs respectively, the outer receiver being also adapted to be connected with a source of compressed air, of a plunger, movable in the inner receiver, having a narrow passage in its lowermost end, and a cleaning needle in said plunger adapted to enter said narrow passage when the plunger occupies its uppermost position, substantially as described.

3. In an air distributing device for milking machines including milking organs adapted respectively to compress the teat at the root and to squeeze the remaining part of the teat, the combination with outer and inner air receivers connected with each other and adapted for connection with said organs respectively, the outer receiver being also adapted to be connected with a source of compressed air, of a plunger, movable in the inner receiver, having a narrow passage in its lowermost end, a screw plug located above and in line with the narrow passage of the plunger, and a clearing needle secured in the center of said screw plug.

4. In an air distributing device for milking machines including milking organs adapted respectively to compress the teat at the root and to squeeze the remaining part of the teat, the combination with outer and inner air receivers connected with each other and adapted for connection with said organs respectively, the outer receiver being also adapted to be connected with a source of compressed air, of a plunger, movable in the inner receiver, and longitudinal guiding flanges on the plunger between which are formed passages through which the air supplied to the inner receiver passes into the outer receiver when the plunger occupies its uppermost position.

5. In an air distributing device for milking machines including milking organs adapted respectively to compress the teat at the root and to squeeze the remaining part of the teat, the combination with outer and inner air receivers connected with each other and adapted for connection with said organs respectively, the outer receiver being also adapted to be connected with a source of compressed air, of a plunger, movable in the inner receiver, having one end constantly open to the outer receiver and the other end provided with a relatively narrow passage opening into the inner receiver and through which air supplied to the other receiver flows to the inner receiver, and a clearing needle extending into the plunger and in line with said narrow passage, there being passages in the side wall of the plunger adapted, when the plunger moves into position to cause the needle to enter said narrow passage, to connect the receivers to permit air to flow from the inner receiver to the outer receiver.

6. In an air distributing device for milking machines including milking organs adapted respectively to compress the teat at the root and to squeeze the remaining part of the teat, the combination with outer and inner air receivers connected with each other and adapted for connection with said organs respectively, the outer receiver being also adapted to be connected with a source of compresed air, of a hollow plunger, movable in the inner receiver, opening into the outer receiver, there being passages adapted, in the reciprocation of the plunger, to respectively and alternately establish communication between the interior of the plunger and the inner receiver and directly between the two receivers.

7. In an air distributing device for milking machines including milking organs adapted respectively to compress the teat at the root and to squeeze the remaining part of the teat, the combination with outer and inner air receivers connected with each other and adapted for connection with said organs respectively, the outer receiver being also adapted to be connected with a source of compressed air, of a plunger in the inner receiver, there being a narrow passage establishing communication between the two receivers, and a clearing needle in line with said passage and adapted, in the movement of said plunger, to alternately enter, and withdraw from, said passage.

In testimony that I claim the foregoing as my invention, I have signed my name in presence of two subscribing witnesses.

ERIK ARVID NILSSON.

Witnesses:
 INGEBORG HENRIKSSON,
 PORSTEN MELINDER.

---

Copies of this patent may be obtained for five cents each, by addressing the "Commissioner of Patents, Washington, D. C."